(12) United States Patent
Scimone

(10) Patent No.: US 6,595,742 B2
(45) Date of Patent: Jul. 22, 2003

(54) AIRCRAFT ENGINE AIR FILTER AND METHOD

(75) Inventor: Michael J. Scimone, Glen Carbon, IL (US)

(73) Assignee: Westar Corporation, St. Charles, MO (US)

( * ) Notice: Subject to any disclaimer, the term of this patent is extended or adjusted under 35 U.S.C. 154(b) by 0 days.

(21) Appl. No.: 09/968,762

(22) Filed: Oct. 2, 2001

(65) Prior Publication Data

US 2002/0182062 A1 Dec. 5, 2002

Related U.S. Application Data

(60) Provisional application No. 60/237,264, filed on Oct. 2, 2000.

(51) Int. Cl.[7] .............................................. F01D 29/70
(52) U.S. Cl. ................................. 415/121.2; 60/39.092; 244/53 B
(58) Field of Search .................... 415/121.2; 416/247 R, 416/146 R; 60/39.092; 244/53 B

(56) References Cited

U.S. PATENT DOCUMENTS

| 3,421,296 A | 1/1969 | Beurer, Sr. |
| 3,449,891 A | 6/1969 | Shohet et al. |
| 3,483,676 A | * 12/1969 | Sargisson ................ 60/39.092 |
| 3,494,380 A | 2/1970 | Martin |
| 3,686,837 A | 8/1972 | Hopkins et al. |
| 3,811,254 A | 5/1974 | Amello |
| 3,998,048 A | * 12/1976 | Derue ..................... 60/39.092 |
| 4,158,449 A | 6/1979 | Sun et al. |
| 4,290,889 A | 9/1981 | Erickson |
| 4,291,530 A | 9/1981 | Ballard |
| 4,488,966 A | 12/1984 | Schaeffer |
| 4,502,875 A | 3/1985 | Ballard |
| 4,699,637 A | 10/1987 | Iniotakis et al. |
| 5,049,172 A | 9/1991 | Shary et al. |
| 5,139,545 A | 8/1992 | Mann |
| 5,662,292 A | 9/1997 | Greene et al. |
| 5,697,394 A | 12/1997 | Smith et al. |

FOREIGN PATENT DOCUMENTS

WO    WO 97/49608    12/1997

* cited by examiner

Primary Examiner—Edward K. Look
Assistant Examiner—Igor Kershteyn
(74) Attorney, Agent, or Firm—Senniger, Powers, Leavitt & Roedel

(57) ABSTRACT

A barrier filter for use in an helicopter to remove contaminants from intake air prior to delivery to an engine. The helicopter has an intake and a peripheral external surface adjacent to the intake. The filter includes a pleated filter element mounted flush across the intake such as to meet the contour of the peripheral external surface. The filter element comprises a porous filter media and having a surface area such that a calculated speed of air flowing through the filter, when the engine is operating at take off power (TOP) or military intermediate rated power (IRP), is less than about 30 ft/sec. The filter may be retrofit into helicopters having other contaminant removal systems. Preferably, the filter is positioned such that intake air is delivered to the engine at a pressure which is substantially independent of whether the helicopter is moving in a forward direction or hovering with no forward motion.

20 Claims, 11 Drawing Sheets

<u>PRIOR ART</u>

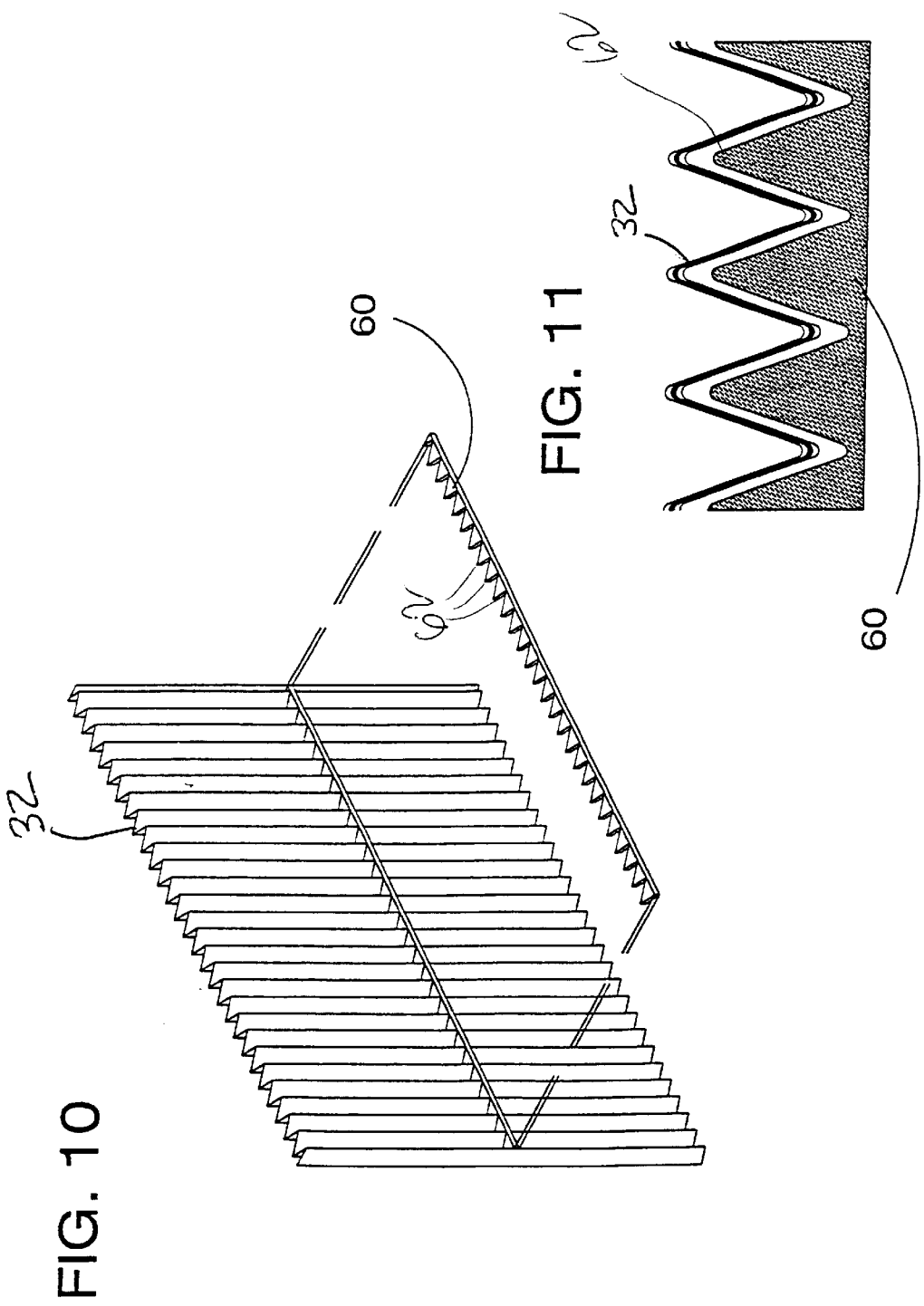

AIRCRAFT ENGINE AIR FILTER AND METHOD

CROSS-REFERENCE TO RELATED APPLICATION

This application claims the benefit of U.S. Provisional Application No. 60/237,264, filed Oct. 2, 2000.

BACKGROUND OF THE INVENTION

This invention relates generally to air intakes for aircraft engines, and in particular to a barrier filter for a helicopter inlet. An air-breathing turbine or piston engine for aircraft propulsion requires intake air that is generally clean to provide for efficient combustion and to avoid internal damage. The engine is designed with small tolerances between moving parts to maximize efficiency, but which also increase vulnerability to damage from small contaminants. Unfortunately, helicopters operate at low altitudes where intake air can be contaminated with material from the ground, such as sand and dust. Rotor downwash aggravates that problem and moreover causes articles such as leaves, dry grass, and debris on the ground to become airborne where they can be ingested by the engine. Contamination of intake air, even in a small amount, causes premature wear on engine components, increases maintenance costs, and degrades operational reliability.

Systems which remove contaminants from intake air flow have been developed to protect the engine from damage. A first type of system is an inertial particle separator, which employs the momentum of each moving contaminant particle to separate it from intake air. Axial flow inertial particle separators (see, e.g., U.S. Pat. No. 5,139,545) have curved intake ducts which direct particles, due to their momentum, into a scavenge area on an outward part of a curved turn, leaving clean air on the inward part of the turn to enter the engine. Vortex flow inertial particle separators (see, e.g., U.S. Pat. No. 3,449,891) have a plurality of tubes with helical vanes which swirl the flow to create centrifugal forces, deflecting particles outwardly for disposal.

Ideally, these systems should remove all contaminants from the intake air flow. One drawback to inertial particle separators is limited effectiveness in removing particles, particularly those of the smallest size. Typical separators remove from 65% to 85% of the contaminants, which can be unacceptably low. Further, these systems should introduce minimal loss of pressure to the intake air as it flows through, and minimal non-uniformity to pressure with aircraft flight speed or direction. High inlet pressure is preferred for good engine performance and uniform for good operational stability of the engine. Unfortunately, some separators become plugged by larger contaminants, which degrades effectiveness and causes a large decrease in inlet pressure. These separators are also difficult to clean when they are plugged.

A second type of system for removing contaminants is a porous barrier filter. The filter is positioned such that in normal operation, all intake air must flow through the filter prior to reaching the engine. The filter is highly effective in removing particles of all sizes and offers cost and performance benefits over inertial type separation.

Unfortunately, integration of barrier filters into aircraft poses a number of difficulties, especially into aircraft that are not originally designed for these systems. Barrier filters must be properly sized to permit adequate quantity of air to flow through without a large pressure drop across the filter. Barrier filters should also be located where re-ingestion of exhaust gas into intake air is avoided, and for military aircraft, avoiding ingestion of exhaust gas from weapons which are fired. The installation of barrier filters should cause minimal change to aircraft external surface contours. Changes to external contours of existing, previously flight certified aircraft could require requalification and recertification testing of the aircraft for operability, performance and handling characteristics. That testing can be expensive and time consuming.

Barrier filters and inlets in which they operate should be located on the aircraft where pressure of the intake air flowing into the engine is relatively independent of directional motion of the aircraft. Otherwise, a change in direction of flight can produce engine instability and performance degradation. For example, a barrier filter positioned in an inlet facing forwardly receives air at an elevated pressure when the helicopter is moving in a forward direction. The increase, or "ram" pressure, is favorable and is the result of converting the momentum of the higher velocity air to a higher pressure and lower velocity, as it flows into the inlet plenum. However, when the helicopter stops moving in a forward direction, the ram pressure is lost. This lower pressure results in a decrease in engine efficiency which is detrimental to stable operation of the engine.

SUMMARY OF THE INVENTION

Among the several objects and features of the present invention that may be noted and the provision of an aircraft engine intake air filtration system which effectively removes contaminants; the provision of such a system which is usable in existing aircraft without modifications to external surface contours; the provision of such a system which can replace previously installed particle separators; the provision of such a system which is conformal to the aircraft external surface contours; the provision of such a system which minimizes loss and non-uniformity of pressure to the intake flow; and the provision of such a system which is positioned to provide intake air having a pressure independent of directional motion of the aircraft.

Generally, an air induction system for a helicopter according to the present invention receives intake air, removes contaminants from the intake air, and provides the intake air for delivery to an engine at a pressure which is substantially independent of whether the helicopter is moving in a forward direction or hovering with no forward motion. The helicopter has a longitudinal axis and a generally horizontal rotor. The system comprises a first entryway for receiving intake air, the first entryway positioned on the helicopter generally facing the forward direction and perpendicular to the longitudinal axis such that forward motion of the helicopter directs intake air to flow directly into the first entryway with an elevated pressure due to the forward motion. A first barrier filter is mounted across the first entryway, the first filter having a porous media and positioned such that all air received in the first entryway flows to the first filter. A second entryway receives intake air, the second entryway being positioned below the rotor and facing generally upwardly such that during hovering flight, the rotor directs intake air downwardly to flow directly into the second entryway with an elevated pressure due to downward motion. A second barrier filter is mounted across the second entryway, the second filter having a porous media and positioned such that all air received in the second entryway flows to the second filter.

In another aspect, a helicopter according to the present invention has an air filtration system to remove contaminants from intake air prior to delivery to an engine. The helicopter has a longitudinal axis. The helicopter comprises an intake for receiving the intake air and a peripheral external surface adjacent to the intake. The peripheral external surface has a smooth, continuous contour in the longitudinal direction which facilitates, during forward flight of the helicopter, generally smooth, streamlined flow of external air adjacent the intake to minimize aerodynamic drag. A barrier filter is mounted in the intake, the filter having a porous filter element. The barrier filter has an upstream side and a downstream side, the upstream side being mounted flush across the intake such as to meet the contour of the peripheral external surface.

In yet another aspect, a method according to the present invention retrofits a helicopter with an improved system for removing contaminants from intake air prior to delivery to an engine. The helicopter has a fuselage with at least two openings for admitting intake air into the fuselage, a surface surrounding each opening with a smooth, continuous contour adjacent to each opening, and an inertial particle separator mounted in each of the openings to remove contaminants from the intake air. The helicopter has an initial external moldline. The method comprises removing the inertial particle separators from each of the openings in the fuselage, and sizing at least two pleated barrier filters for the openings such that a calculated speed of intake air flowing therethrough, when the engine is operating at take off power (TOP) or military intermediate rated power (IRP), is less than about 30 feet/second. The pleated barrier filters are mounted in corresponding openings in the fuselage, each filter having an upstream surface and a downstream surface. The filter is mounted such that the upstream side meets and substantially conforms to the contour of the surface such that the mounting does not alter the initial external moldline of the helicopter.

Other objects and features will be in part apparent and in part pointed out hereinafter.

BRIEF DESCRIPTION OF THE DRAWINGS

FIG. 10 is an exploded perspective view of a comb behind a barrier filter;

FIG. 11 is a schematic sectional view showing a comb placed behind a barrier filter.

Corresponding reference characters indicate corresponding parts throughout the several views of the drawings.

DETAILED DESCRIPTION OF THE PREFERRED EMBODIMENT

Figure 1A:
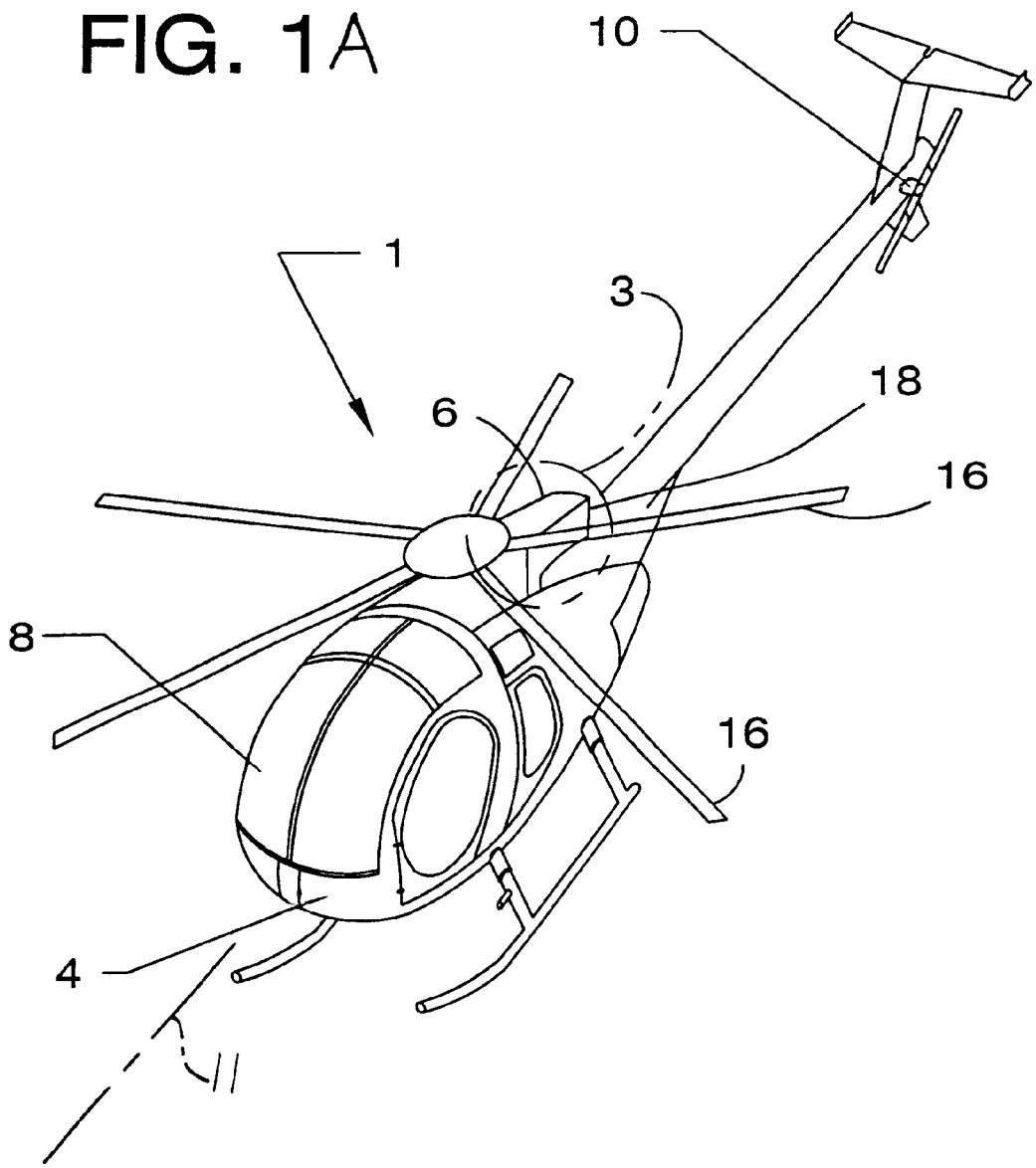
FIG. 1A is a perspective view of a first helicopter.
Figure 1B:
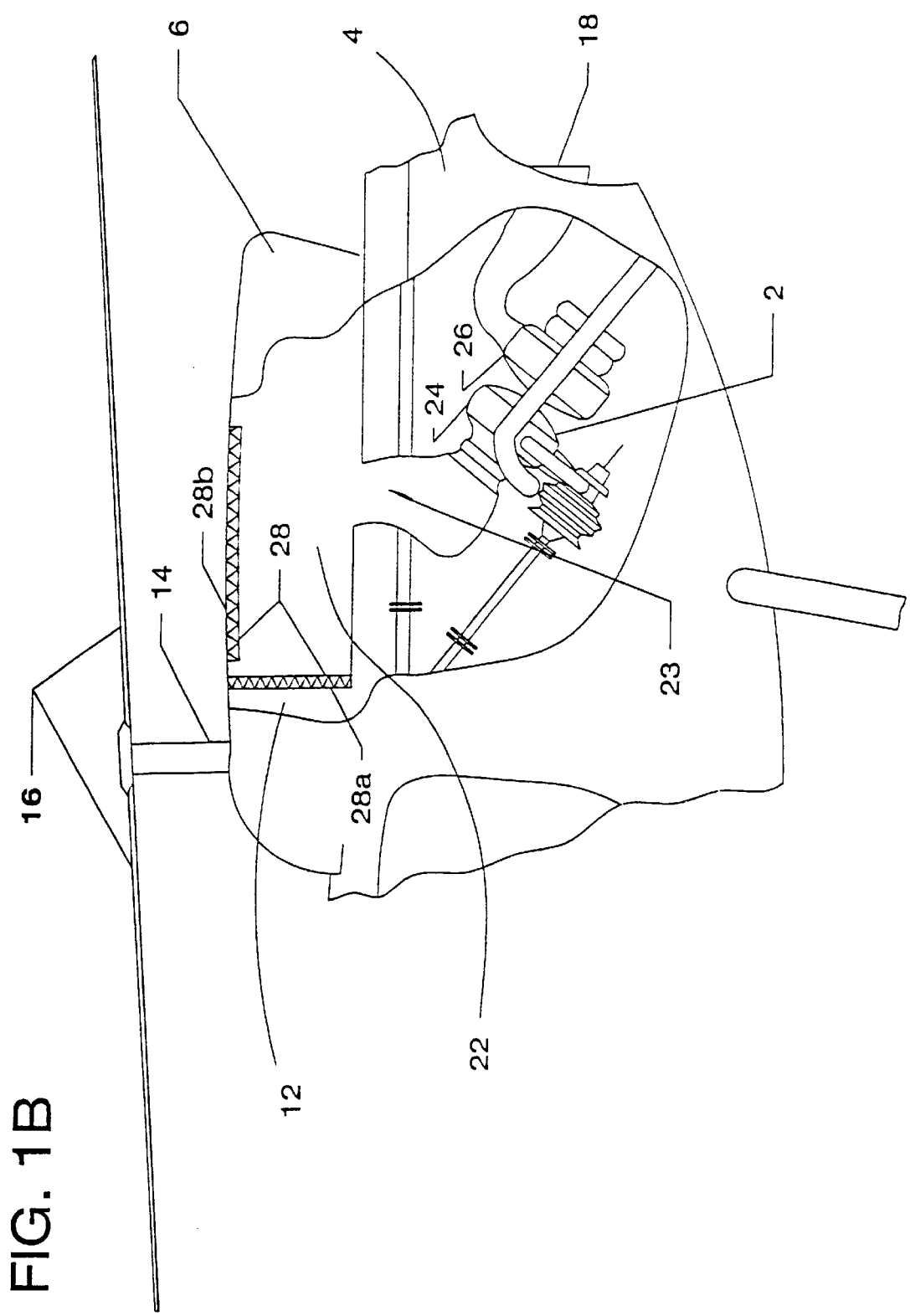
FIG. 1B is an enlarged fragmentary side view of the helicopter of FIG. 1A showing an engine intake air system including an engine inlet plenum, cowling, and a barrier filter system in accordance with the present invention.

Referring now to the drawings and in particular to FIGS. 1A and 1B, a helicopter aircraft is designated generally by the reference numeral 1. A fuselage 4 includes a cowling 6 enclosing an inlet air plenum 22. A cockpit 8 and a tail rotor 10 are included on the helicopter 1. Propulsion power is provided by an internal combustion engine 2 (FIG. 1B), which can be either a turbine or piston engine as known in the art. The helicopter 1 has a longitudinal axis 11.

Referring to FIG. 1B, a front of the cowling 6 forms a capture area opening 12 for the engine intake air to enter for use by the engine 2 in the fuel combustion process. The opening 12 can be positioned aft of the rotor drive shaft 14, or mast, carrying rotor blades 16, or at other alternative positions depending on the particular engine intake and airframe integration of the aircraft.

The cowling 6 covers the inlet air plenum 22. The engine 2 discharges combustion products and air (i.e., exhaust gas) through an exhaust duct 18 in the aft section of the fuselage 4. A passage 23 in the plenum 22 is provided to deliver intake air from the capture area opening 12 to engine 2. The intake air flows through a compressor 24, is mixed with fuel and burned in a combustor, and then passes through a turbine 26 and out the exhaust duct 18.

Figure 2:
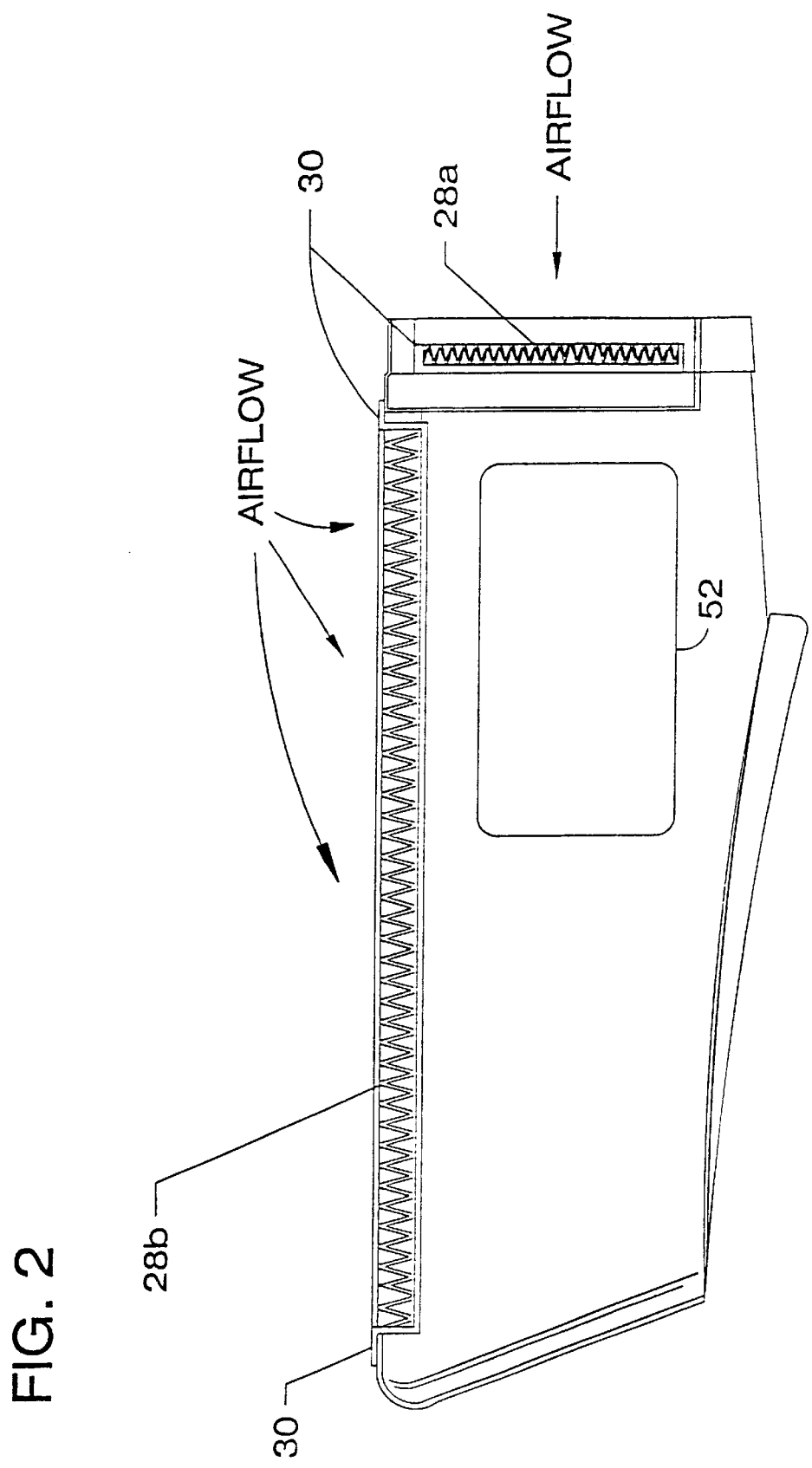
FIG. 2 is an enlarged fragmentary side view of the cowling and barrier filter system.
Figure 3:
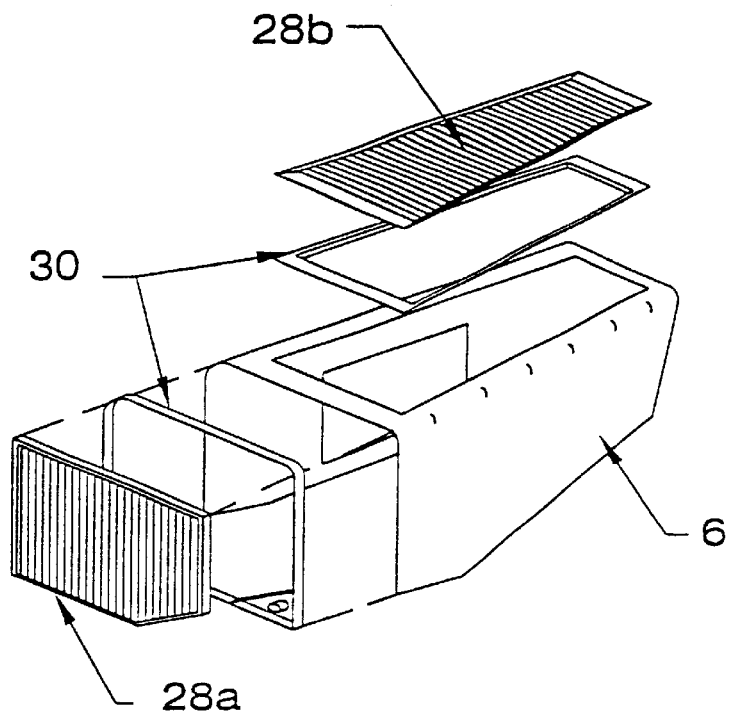
FIG. 3 is an exploded perspective view of the barrier filter system and cowling.

Referring to FIGS. 1B, 2 and 3, a plurality of barrier filters 28 in accordance with the present invention are interposed between the ambient air and the passage 23 so that intake air is drawn through the barrier filters for removal of particulates before flowing to the engine 2. Maximum surface area of the barrier filter enhances engine performance, thereby improving safety when operating in erosive environments. In the illustrated embodiment of FIGS. 1B, 2 and 3, two barrier filters are provided and are designated 28a and 28b. Barrier filter 28a is mounted in the capture area opening 12 and barrier filter 28b is mounted in an opening in the top of cowling 6. It is to be understood that alternative positioning of the barrier filters can be provided, some of which are described below.

The barrier filters 28 are each removable and mounted in cowling 6 with a retention frame 30. The frame 30 is such as to securely retain the respective barrier filter 28a, 28b in place, yet allow for its easy replacement. An exemplary material for the frame is aluminum, although the particular structure of the frame may vary by the type of aircraft and its specific design and configuration.

Figure 4:
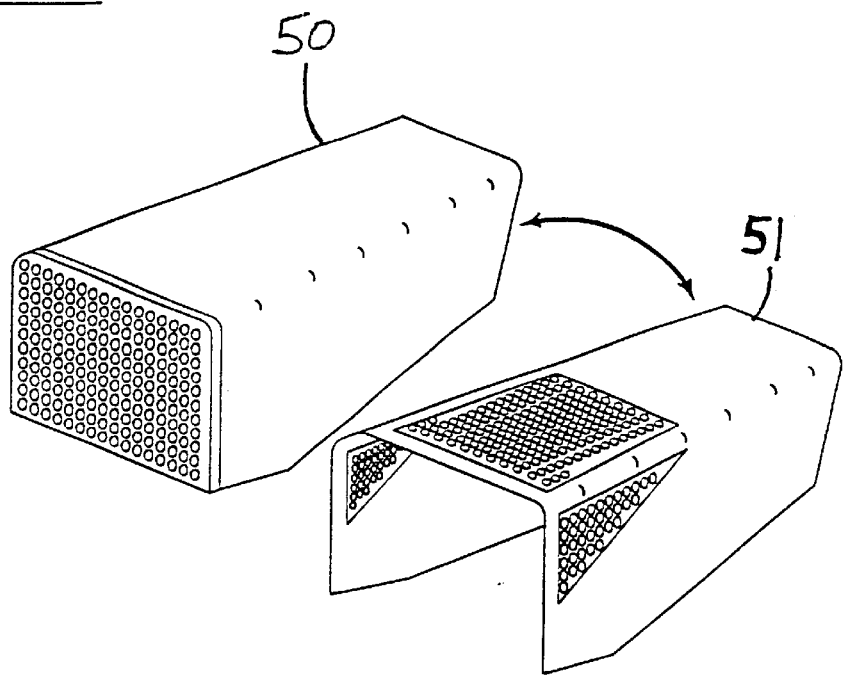
FIG. 4 is a perspective view of two prior art inertial particle separator devices each mounted in a cowling.

Barrier filters 28a, 28b can be used to replace a preexisting inertial particle separator (e.g., vortex) air cleaner device, such as in cowl 50 or cowl 51 as shown in FIG. 4.

The barrier filters 28a, 28b are positioned to provide intake air to the engine at a pressure that is substantially independent of forward velocity of the aircraft 1, thereby providing for stable engine operation throughout the envelope of airspeeds experienced by the aircraft. The filter 28a is generally flat and perpendicular to the longitudinal axis of the aircraft and is generally forward facing. Barrier filter 28b is mounted in the cowling 6 with its outermost portion positioned flush with the outer surface of cowling 6 and lies in a generally horizontal plane and faces generally upward. When the helicopter is taking off or hovering, downwash from the rotor has largely a vertical component of motion so that air directly enters filter 28b. The vertical speed provides ram air pressure to the intake air resulting in a relatively high pressure recovery across the filter. Filter 28a is oriented perpendicularly to the vertical flow so that it receives no benefit from ram pressure in hover, and therefore produces higher pressure drop than through filter 28b. When the aircraft transitions into forward motion, the forward velocity becomes greater than the downwash velocity, so that filter 28a is directly impinged and realizes higher ram air pressure (lower inlet plenum pressure drop). Meanwhile, filter 28b is now oriented perpendicularly to the primary direction of flow and its contribution to good pressure recovery at the engine is reduced. Therefore, in either hover or forward flight, the plenum 22 receives air with good pressure recovery through at least one filter so that pressure drop is somewhat constant with airspeed. The pressure of intake air provided to the engine is thus stabilized during transitional flight, enhancing engine performance and operational stability.

The placement of barrier filters at alternative orientations or facing different directions can enhance engine operational stability. For instance, a barrier filter may be located facing a lateral direction of the aircraft which will provide pressure enhancement during any sideward motion of the aircraft. However, an intake at such a lateral position can be more susceptible to reingestion of exhaust gas, or in military aircraft, ingestion of weapon exhaust gas from a plume of a fired rocket/missile or guns, and is generally disfavored.

The barrier filters 28a, 28b and frames 30 are conformal, i.e., positioned along or within aircraft moldlines. At these locations they have minimal effect on the aerodynamic flowfield around the aircraft in flight (i.e., slipstream) so as to avoid a need to require recertification or retesting of aircraft operability and performance when replacing original equipment filtering devices. With regard to barrier filter 28b, the filter and frame have a negligible effect on the aircraft's surrounding flowfield because they do not extend significantly beyond the outer surface of the aircraft in which they are mounted. Therefore, there is no need to recertify or retest the aircraft performance and aerodynamics in a wind tunnel, flight test or the like. Although the filter 28b is shown as flush, it can be recessed below flush or even slightly above flush and not substantially change the aerodynamic flowfield surrounding the aircraft. In non-military aircraft, there is more latitude to position the filter 28 since military requalification is not an issue. Military requalification requires consideration of specific characteristics not common to commercial aircraft such as armament gas ingestion.

The contour of the fuselage, particularly with military aircraft, cannot be changed without likely expensive and time consuming requalification/recertification of the aircraft. Since the aircraft shape is thus fixed and the size of the barrier filter that can be placed in the existing inlet to replace a vortex cleaner is limited, increased capacity for air cleaning has been limited. The present invention provides an air cleaning system that will provide increased air cleaning capacity without major modification to the aircraft, precluding recertification since the contour of the aircraft is essentially unchanged (i.e., the barrier filter system is conformal) and further, should not change the radar or heat signature profile of the aircraft, particularly for military aircraft.

Figure 5:
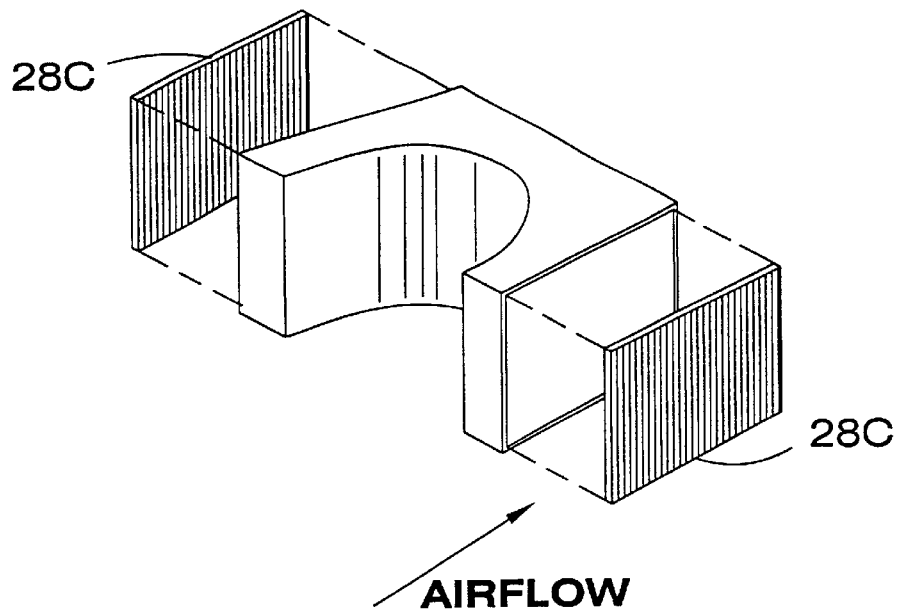
FIG. 5 is an exploded perspective view of an alternate embodiment of the barrier filter system in accordance with the present invention showing the barrier filters in a side mounted position.
Figure 6A:
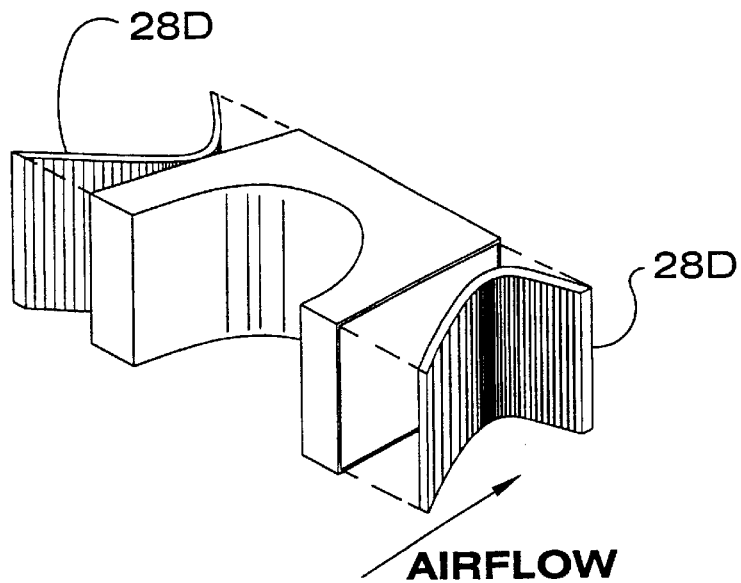
FIG. 6A is an exploded perspective view of an additional alternate embodiment of the barrier filter system in accordance with the present invention showing curved barrier filters in a side mounted position.
Figure 6B:
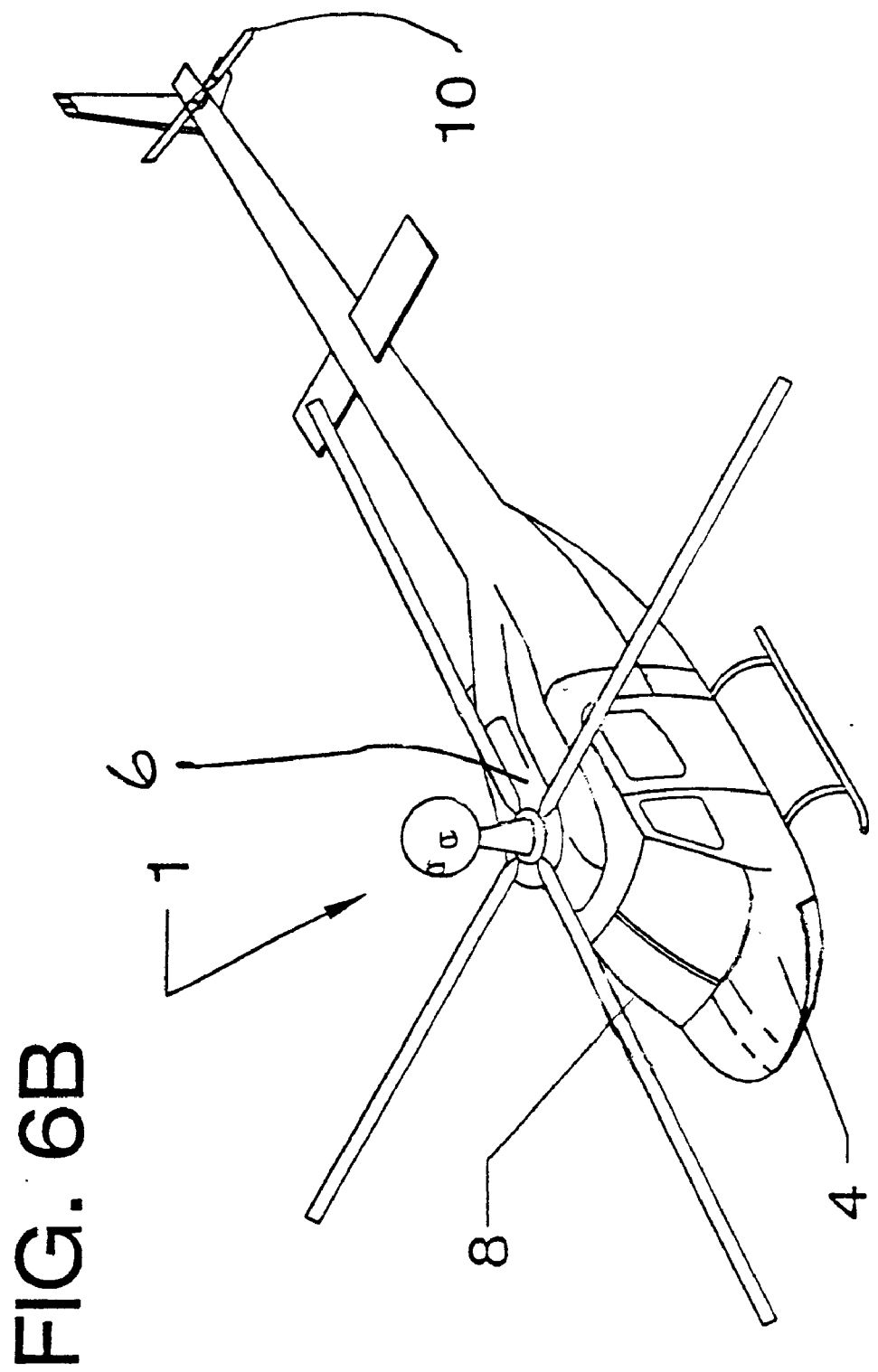
FIG. 6B is a perspective view of a second helicopter.
Figure 7A:
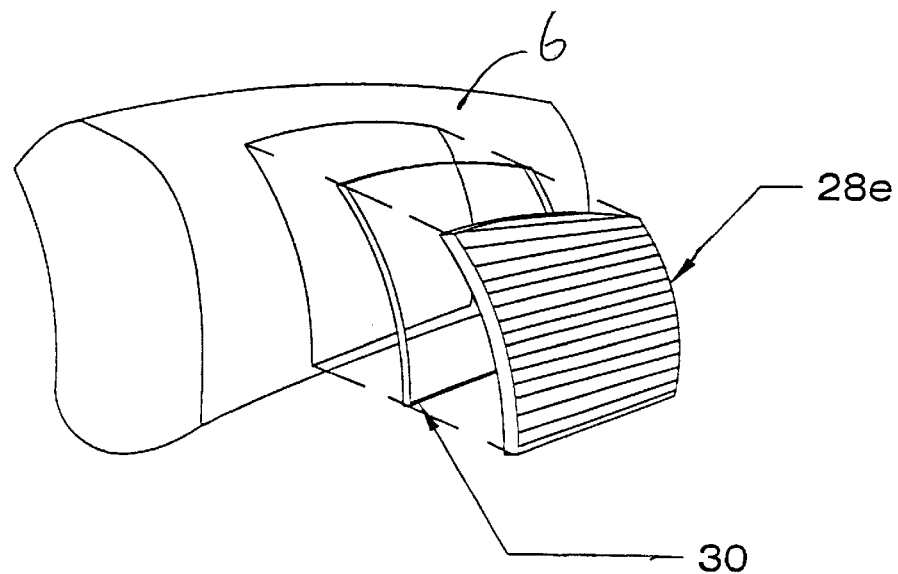
FIG. 7A is an exploded perspective view of an additional alternate embodiment of the barrier filter system in accordance with the present invention showing the barrier filter mounted in the side of the cowling and conformal to the adjacent surface of the cowling.
Figure 7B:
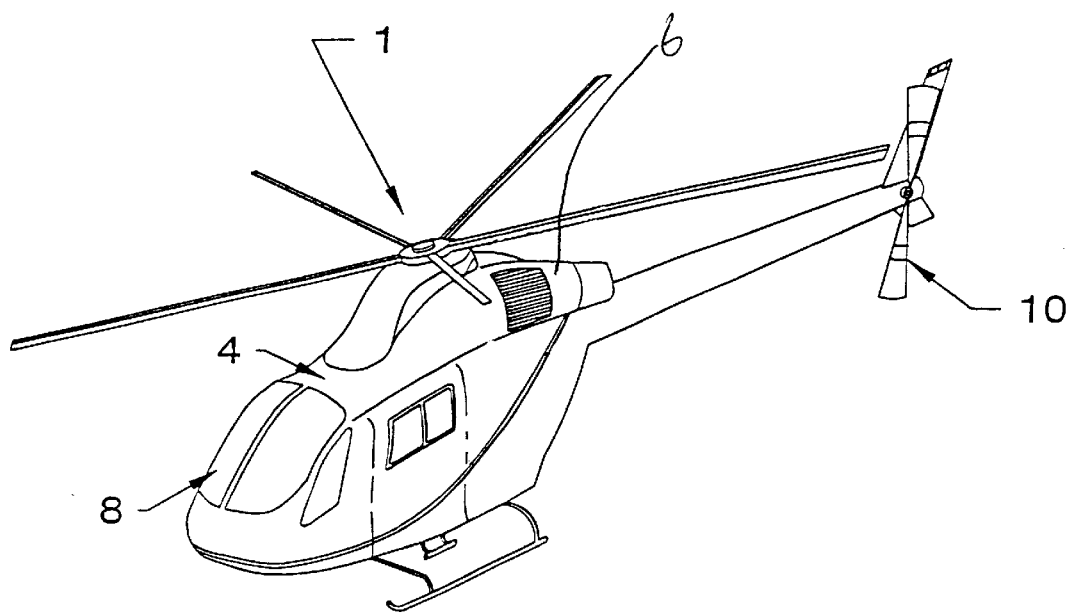
FIG. 7B is a perspective view of a third helicopter.

FIGS. 5 and 6A illustrate alternative embodiments of the barrier filter system that may be used with the helicopter of FIG. 6B. That helicopter has two oppositely facing side openings in a cowling 6 for receiving intake air. A pair of barrier filters designated 28c (FIG. 5) and 28d (FIG. 6A) are mounted in the openings in the cowling 6 such that they face generally toward opposite sides of aircraft 1 and are generally parallel to the longitudinal axis of the aircraft. Barrier filters 28c are generally planar. Barrier filters 26d are contoured or curved as shown in FIG. 6A. A curved barrier filter allows more surface area of filter material to be used for a given size opening. FIG. 7A shows another embodiment of a curved barrier filter 28e mounted in a side-facing opening in cowling 6, which is shown on the aircraft of FIG. 7B. Barrier filters 28c, 26d and 28e are otherwise of generally the same construction as barrier filters 28a and 28b as described herein.

In order to achieve optimal operating life in erosive environments, it has been found that an effective surface area of the filter element should preferably be sized such that a calculated mean velocity of intake air approaching the filter element is less than about 30 ft/sec, more preferably in the range of from about 15 ft/sec to about 25 ft/sec, at the engine's commercial take off power (TOP) rating or military intermediate rated power (IRP).

When sized in this way, the barrier filter is effective at separating contaminants, and provides a lower pressure drop characteristic across the filter. Barrier filter 28 is constructed so that when intake air is within the aforementioned mean velocities and the filter is clean, the filter will achieve a particle removal efficiency of at least about 96%, preferably at least about 98%, of the AC Coarse dust particles and at least about 95%, preferably at least about 97%, of the AC Fine dust particles. As known in the art, AC Coarse (defined in Society of Automotive Engineers (SAE) J726 Air Cleaner Test Code) dust has particle sizes ranging from 0 to 200 microns and mean diameter of about 80 microns. AC Fine dust has particle sizes ranging from 0 to 80 microns and mean diameter of about 8 microns. It is preferred that the barrier filter system (structural, bypass, all components except filter elements) have a service life of 6,000 flight hours and the barrier filter elements have a service life of at least 1,500 hours, assuming service intervals (for cleaning and removal of collected contaminants) of 100 operating hours. That service life is achievable when the barrier filter is properly sized.

The intake air speed will vary with the rotational speed (RPM) of the engine 2. As engine power setting is varied over a course of one flight, the engine requires varying intake airflow. The maximum volumetric flow rate for intake air typically occurs at the engine's commercial take off power (TOP) rating or military intermediate rated power (IRP). TOP and IRP power ratings are for a steady state condition (i.e., greater than about 5 minutes). As used herein, the reference to maximum volumetric flow rate is for a maximum steady state volumetric flow rate condition. It is understood that absolute maximum volumetric flow rate will occur at a transient condition above the TOP or IRP power ratings. It is preferred that the projected surface area of the barrier filter 28 be sized such that the ratio of surface area to maximum volumetric flow rate be in the range of from about 10 to about 30 ft/sec and preferably in the range of from about 15 to about 25 ft/sec. Projected surface area is that area available to physically install a barrier filter. For a flat filter element the projected area of the surface of the filter element 32 in a flat condition is its planform area. For example, a flat barrier filter with effective area measuring 10 inches by 10 inches will have a projected surface area of 100 square inches, also its planform area. For a curved filter element the projected area remains constricted to the size of the physical opening, but its planform area will increase based on its configuration. Total surface area for a pleated filter is the total area of each pleat multiplied by the number of pleats.

A mean velocity of intake air approaching the filter element may be calculated assuming the intake air is an ideal gas at sea level standard day atmospheric pressure and temperature. The factors include the volumetric flow rate of the engine and the effective surface area of the barrier filter which receives that flow rate. It is noted that actual local air velocities within individual pleats and areas of the barrier filter will vary from the mean.

Sizing may be accomplished by adjusting 1) pleat height, 2) pleat pitch (number of pleats per inch), or 3) alignment and orientation of the filter relative to a cowl or passage in which it is installed. Regarding the first two adjustments, these changes alter not only the surface area but also local velocities of intake air as it flows to the pleats. Regarding the third adjustment, it is noted that a filter installed in a curved manner (FIG. 6A) will be longer than a filter installed flat (FIG. 5), and will have a larger surface area. Also, a curved filter causes the intake air to impinge pleats at a different angle relative to the filter element than when the filter extends in a generally straight line across a duct. The angle is dependent on a specific duct and pleat geometry. However, in a typical duct, air initially strikes pleats in a more direct or perpendicular angle when the filter is curved than when straight. That can lead to increased effectiveness in removing particles, i.e., improved capture efficiencies.

Since the available installation space is usually at a premium, the filter element 32 is preferably a pleated configuration to obtain adequate surface area within the size limits of the air intake system to achieve the aforementioned air flow speeds in the engine cowling 6 or inlet plenum 22. Pleating effectively increases the available surface area of the filter element, preferably at least six fold over the frontal area of the inside perimeter of the frame 34. Pleating also increases the rigidity of the filter element 32, increasing its structural capabilities. A pleat height H (FIG. 8A) preferably ranges from 1 to 3 inches and pleat pitch ranges from 2 to 6 pleats per inch.

The stiffness of the barrier filter can be augmented, particularly for filters with large pleat heights, with a structural comb 60 placed behind and/or in front of the filter media pleats, as shown in FIGS. 10 and 11. The comb extends across the filter between its side edges, and has a plurality of teeth 62 which fit between adjacent sets of pleats and engage the side of the filter. The comb 60 supports the filter while maintaining flow area, maintaining a low pressure drop, and not interfering with cleaning. There can be one comb or multiple, spaced combs, and they can be mounted upstream and/or downstream of the filter. The shapes and number of the teeth 62 may vary without departing from the scope of this invention.

In operation of barrier filter 28, the pressure drop across the filter should be kept as low as possible. In general, pressure drop is lower with a larger effective surface area of the filter. As measured in a clean condition, the filter is constructed to achieve a pressure drop of less than about 4.0 inches of water, preferably less than about 2.0 inches of water and more preferably less than about 1.0 inch of water when measured at TOP or IPR air flow. After exposure to operation in a severe environment, the filter construction should be such that after 100 hours of operation, the pressure drop should be less than about 25 inches of water, preferably less than about 15 inches of water and more preferably less than about 10 inches of water.

Figure 8A:
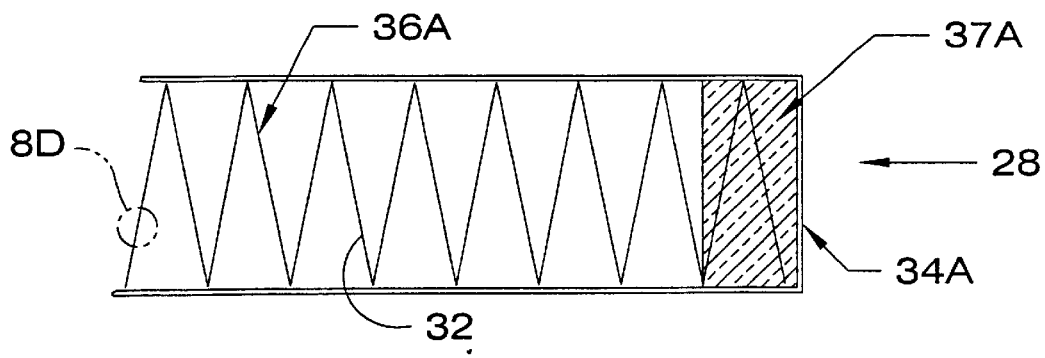
FIG. 8A is an enlarged fragmentary sectional view of a barrier filter utilizing a metal frame and a potting material securing the barrier filter element to the frame.
Figure 8B:
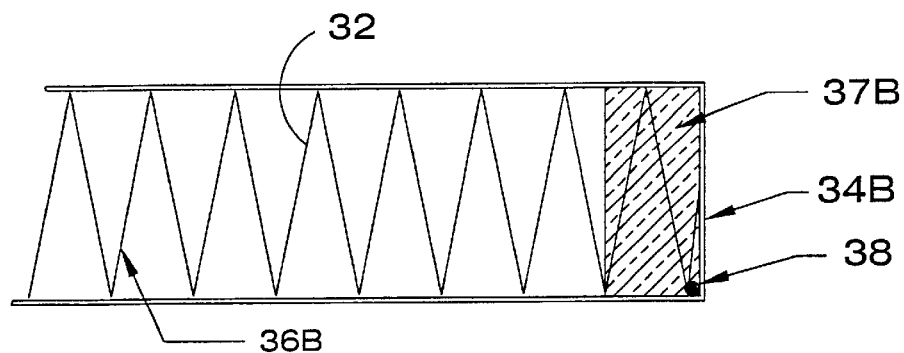
FIG. 8B is an enlarged fragmentary sectional view of a barrier filter utilizing a metal frame with potting material and welds securing the barrier filter element to the frame.
Figure 8C:
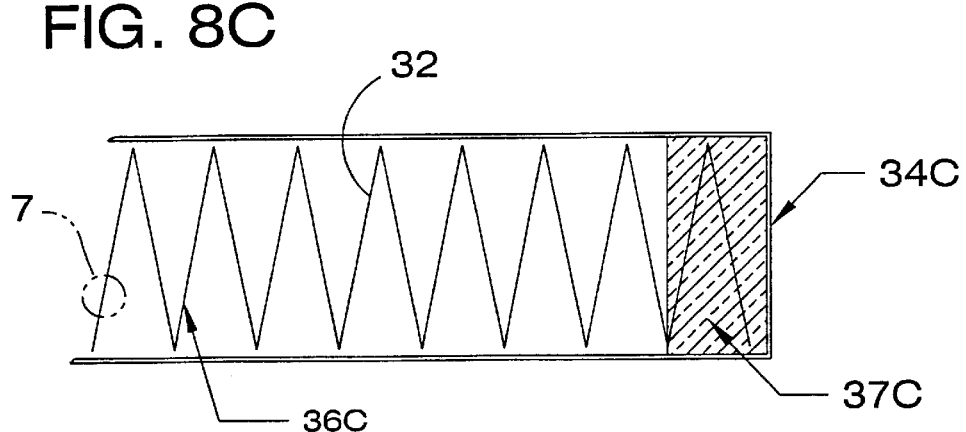
FIG. 8C is an enlarged fragmentary sectional view of a barrier filter utilizing a composite frame and a potting material securing the barrier filter element to the frame.
Figure 8D:
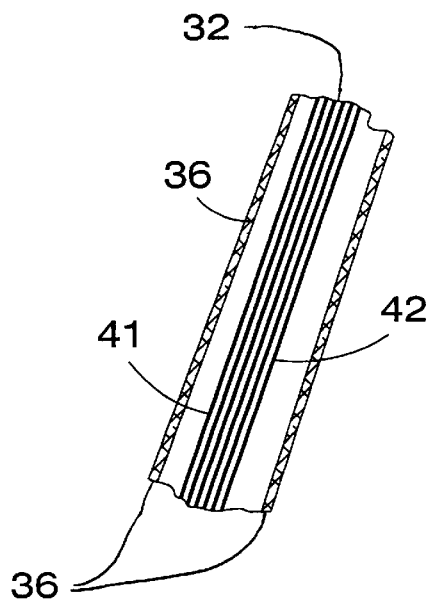
FIG. 8D is an enlarged sectional view of a portion of the barrier filter element and screen material referenced in the area designated 8D in FIG. 8A.

Referring to FIGS. 8A–D, the barrier filters 28 comprise a filter element 32 mounted in a filter frame 34 and preferably include filter element reinforcing screen designated 36. The size and shape of the frame 34 will be determined by the aircraft in which the filter 28 will be installed. If required to further enhance life of the filter 28, it is reinforced with the reinforcement screen 36 (FIG. 8D). The reinforcement screen is preferably made of abrasion and corrosion resistant material, which is also preferably fire resistant. The screen material is corrosion resistant so as to not be subject to rusting or corrosion when exposed to oxygen and water or a marine environment. Preferred materials of construction include metals and metal alloys such as stainless steel (e.g., type 316 stainless steel) and aluminum and metals and metal alloys having a wear-resistant, protective (e.g., polymeric) coating. The screen has mesh size such that it has at least about 60% open area, preferably at least about 65% open area and more preferably at least about 70% open area. A preferred screen includes 16 wires per inch (16×16) of about 0.009 inches diameter. The diameter or thickness of the wires of which the screen is made is greater than about 0.005 inches and preferably in the range of from about 0.005 inches to about 0.015 inches.

The reinforcement screen 36 conforms generally to the pleated contour of filter element 32 and can be in contact with the upstream and downstream surfaces 41, 42 of the filter element. The use of reinforcement screen 36 can help reduce abrasion damage to the filter element 32 as well as help reinforce it structurally. The orientation of the pleats can also be configured to be generally perpendicular to the direction of air flow impinging on the upstream surface 41 of the filter element 32, enhancing the capture capability of the filter media. This may require the use of baffles or other air flow directors (not shown) to achieve optimum airflow characteristics.

Filter element 32 is comprised of material capable of achieving the aforementioned AC Course test dust and AC Fine test dust particle removal efficiencies. In a preferred embodiment the filter media is made of a material that will also be resistant to damage by water and other liquids it may encounter in operation. Preferred filter media includes woven cotton or polyester or a felt. When cotton is employed as the filter media, the filter media is preferably a cotton grid fabric comprised of a plurality of overlapping layers of woven cotton material (which is shown in FIG. 8D as six layers for convenience). Preferably, the number of layers is in the range of from 3 to 6. To improve the filter efficiency for finer particles, the filter media may be impregnated with oil, which not only improves on particle removal, but also helps resist moisture absorption by the filter media rendering it waterproof. Suitable filter oil is commercially available. The use of oil also helps indicate the amount of particles captured by the filter element 32 through change in color from the original oil color (e.g., red or green) to brown/black.

Figure 9:
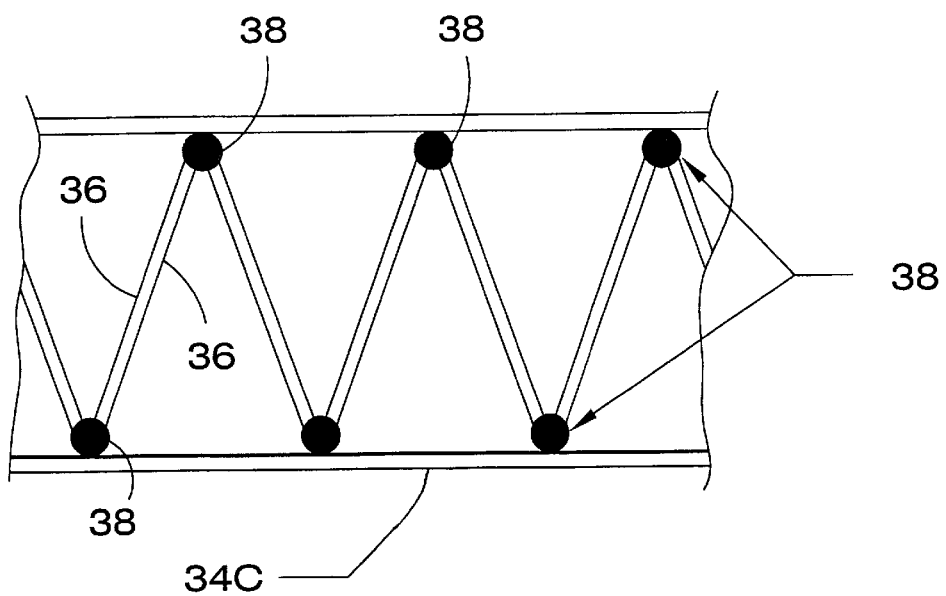
FIG. 9 is an enlarged fragmentary sectional view of the barrier filter element of FIG. 8B showing welded connections between the screen and frame.

Referring to FIGS. 8A–C the filter frame 34 can be any suitable frame and is preferably a structural frame with the filter element 32 being mechanically bonded in place by adhesion or physical connection. The filter element 32 is held in place in the filter frame 34 in any suitable manner. As seen in FIGS. 8A–C, three forms of retention are illustrated. FIG. 8A illustrates an aluminum frame 34A and screens 36A which are also aluminum. The screens 36A and filter element 32 are held in place within the frame 34A with a polymeric potting material 37A such as polysulphite or polyurethane. The potting material functions as a sealant to seal the perimeter (i.e., side edges) of the filter element, structurally adhering it to the frame and preventing unfiltered air from passing between the frame and the filter element. FIG. 8B illustrates a stainless steel frame 34B and stainless steel screens 36B. The screens can be tack welded in place at weld points 38 (see FIG. 9) and then polymeric potting material 37B such as polysulphite, polyurethane or epoxy can be applied. FIG. 8C illustrates a composite frame 34C which can be made from fiberglass or other composite material. The screens 36C with the filter element 32 therebetween is secured with potting material 37C such as a polysulphite, polyurethane, or epoxy.

If the barrier filter becomes plugged with contaminants to a degree where adequate airflow can not be provided to the engine, a by-pass door 52 (FIG. 2), or auxiliary inlet, is provided that can be opened to supply intake air through a second flow path. This permits the engine to continue to operate with minimal loss of power to insure immediate safe flight. The bypass door 52 is shown on the side of the cowl of FIG. 2, although other locations are possible. Typically, a bypass door has a screen to protect against large foreign objects in the air, but will not have a barrier filter element. Therefore, the engine is left unprotected against small contaminants in the intake air that enters through the bypass door.

Maintenance personnel can readily clean the barrier filter by backflushing with a spray of water.

Figure 12:
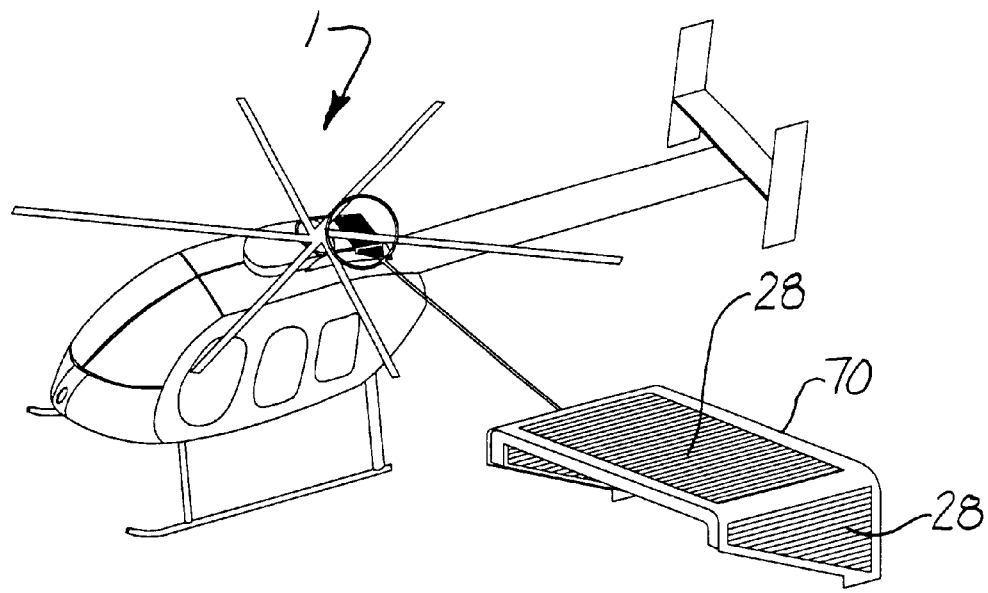
FIG. 12 is a perspective view of a fourth helicopter with a cowling which is exploded and enlarged.

A fourth helicopter 1 with a cowl 70 which holds barrier filters 28 on the upward facing side and two lateral sides is shown in FIG. 12. The cowl 70 may initially contain panels of inertial particle separators. The cowl shown on FIG. 12 has been retrofitted by removing the separators and installing pleated barrier filters 28.

Although the present invention is primarily intended for rotary wing, helicopter type aircraft, it is to be understood that the invention is applicable to fixed wing aircraft without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. An air induction system for a helicopter to receive intake air, remove contaminants from said intake air, and provide said intake air for delivery to an engine at a pressure which is substantially independent of whether the helicopter is moving in a forward direction or hovering with no forward motion, the helicopter having a longitudinal axis and a generally horizontal rotor, the system comprising:

a first entryway for receiving intake air, the first entryway positioned on the helicopter generally facing said forward direction and perpendicular to said longitudinal axis such that forward motion of the helicopter directs intake air to flow directly into said first entryway with an elevated pressure due to said forward motion;

a first barrier filter mounted across said first entryway, the first filter having a porous media and positioned such that all air received in said first entryway flows to said first filter;

a second entryway for receiving intake air, the second entryway positioned below said rotor and facing generally upwardly such that during hovering flight, said rotor directs intake air downwardly to flow directly into said second entryway with an elevated pressure due to downward motion; and a second barrier filter mounted across said second entryway, the second filter having a porous media and positioned such that all air received in said second entryway flows to said second filter.

2. An air induction system as set forth in claim 1 further comprising a plenum for receiving intake air from both the first and second entryways prior to delivery of the air to said engine, the plenum having an outer periphery including a front side, a top side, and two lateral sides, wherein said first entryway comprises an opening formed in said front side and wherein said second entryway comprises an opening formed in said top side.

3. An air induction system as set forth in claim 2 wherein said two lateral sides of the plenum are substantially solid.

4. An air induction system as set forth in claim 2 wherein said first barrier filter and said second barrier filter each comprise a pleated filter element.

5. An air induction system as set forth in claim 4 wherein each of said pleated filter elements has side edges, and further comprising:

a reinforcing screen positioned adjacent said filter element and conforming generally to the pleated contour thereof;

a frame supporting said filter element and said reinforcing screen, the side edges of the filter element engaging the frame; and a sealant for sealing the side edges of the filter element against the frame.

6. An air induction system as set forth in claim 5 wherein each of said filter elements has an upstream side and a downstream side, and further comprising a comb extending between the side edges, the comb having a plurality of teeth which engage the upstream or downstream side of the filter element and are positioned between adjacent sets of pleats, the comb adapted to support the barrier filter.

7. An air induction system as set forth in claim 6 wherein said porous filter media is a cotton fabric material impregnated with oil.

8. An air induction system as set forth in claim 7 wherein said reinforcing screen is metallic.

9. A helicopter having an air filtration system to remove contaminants from intake air prior to delivery to an engine, the helicopter having a longitudinal axis, the helicopter comprising:

an intake for receiving said intake air;

a peripheral external surface adjacent to said intake, the peripheral external surface having a smooth, continuous contour in the longitudinal direction which facilitates, during forward flight of the helicopter, generally smooth, streamlined flow of external air adjacent the intake to minimize aerodynamic drag;

a barrier filter mounted in said intake, the filter having a porous filter element;

wherein said barrier filter has an upstream side and a downstream side, the upstream side being mounted flush across said intake such as to meet said contour of the peripheral external surface.

10. A helicopter as set forth in claim 9 wherein said filter element is pleated.

11. A helicopter as set forth in claim 10 wherein said barrier filter is curved and recessed in said intake inside of said contour.

12. A helicopter as set forth in claim 10 wherein said barrier filter substantially conforms to said contour.

13. A helicopter as set forth in claim 12 wherein there are at least two intakes and at least two corresponding barrier filters mounted in each intake.

14. A helicopter as set forth in claim 13 wherein said filter element has side edges and further comprising a comb extending between the side edges of at least one of said barrier filters, the comb having a plurality of teeth which engage the upstream or downstream side of the filter and are positioned between adjacent pleats, the comb adapted to support the barrier filter.

15. A helicopter as set forth in claim 14 further comprising:

a reinforcing screen positioned adjacent said filter element and conforming generally to the pleated contour thereof;

a frame supporting said filter element and said reinforcing screen, side edges of the filter element engaging the frame; and a sealant for sealing the side edges of the filter element in generally airtight position against the frame.

16. A helicopter as set forth in claim 15 wherein said porous filter media is a cotton fabric material impregnated with oil.

17. A helicopter as set forth in claim 16 wherein said reinforcing screen is metallic.

18. A helicopter as set forth in claim 17 wherein said barrier filters are sized such that a calculated speed of air flowing therethrough, when the engine is operating at take off power (TOP) or military intermediate rated power (IRP), is less than about 30 ft/sec.

19. A method of retrofitting a helicopter with an improved system for removing contaminants from intake air prior to delivery to an engine, the helicopter having a fuselage with at least two openings for admitting intake air into said fuselage, a surface surrounding each opening with a smooth, continuous contour adjacent to each opening, and an inertial particle separator mounted in each of said openings to remove contaminants from the intake air, the helicopter having an initial external moldline, the method comprising:

removing said inertial particle separators from each of said openings in the fuselage;

sizing at least two pleated barrier filters for said openings such that a calculated speed of intake air flowing therethrough, when said engine is operating at takeoff power (TOP) or military intermediate rated power (IRP), is less than about 30 feet/second;

mounting said pleated barrier filters in corresponding openings in the fuselage, each filter having an upstream surface and a downstream surface, the filter being mounted such that the upstream side meets and substantially conforms to said contour of said surface such that said mounting does not alter said initial external moldline of the helicopter.

20. A method as set forth in claim 19 wherein said step of mounting barrier filters further comprises:

attaching side edges of a pleated filter to a frame for supporting said filter;

sealing said side edges of the filter to the frame with a sealant; and connecting said frame into said opening.

* * * * *

UNITED STATES PATENT AND TRADEMARK OFFICE
CERTIFICATE OF CORRECTION

PATENT NO.    : 6,595,742 B2
DATED         : July 22, 2003
INVENTOR(S)   : Scimone It is certified that error appears in the above-identified patent and that said Letters Patent is hereby corrected as shown below:

<u>Title page,</u>
Item [*] Notice: Subject to any disclaimer, the term of this patent is extended or adjusted under 35 USC 154(b) by (0) days
Delete the phrase "by 0 days" and insert -- by 85 days --

Signed and Sealed this

Twenty-fifth Day of November, 2003

JAMES E. ROGAN
*Director of the United States Patent and Trademark Office*